Patented Nov. 17, 1925.

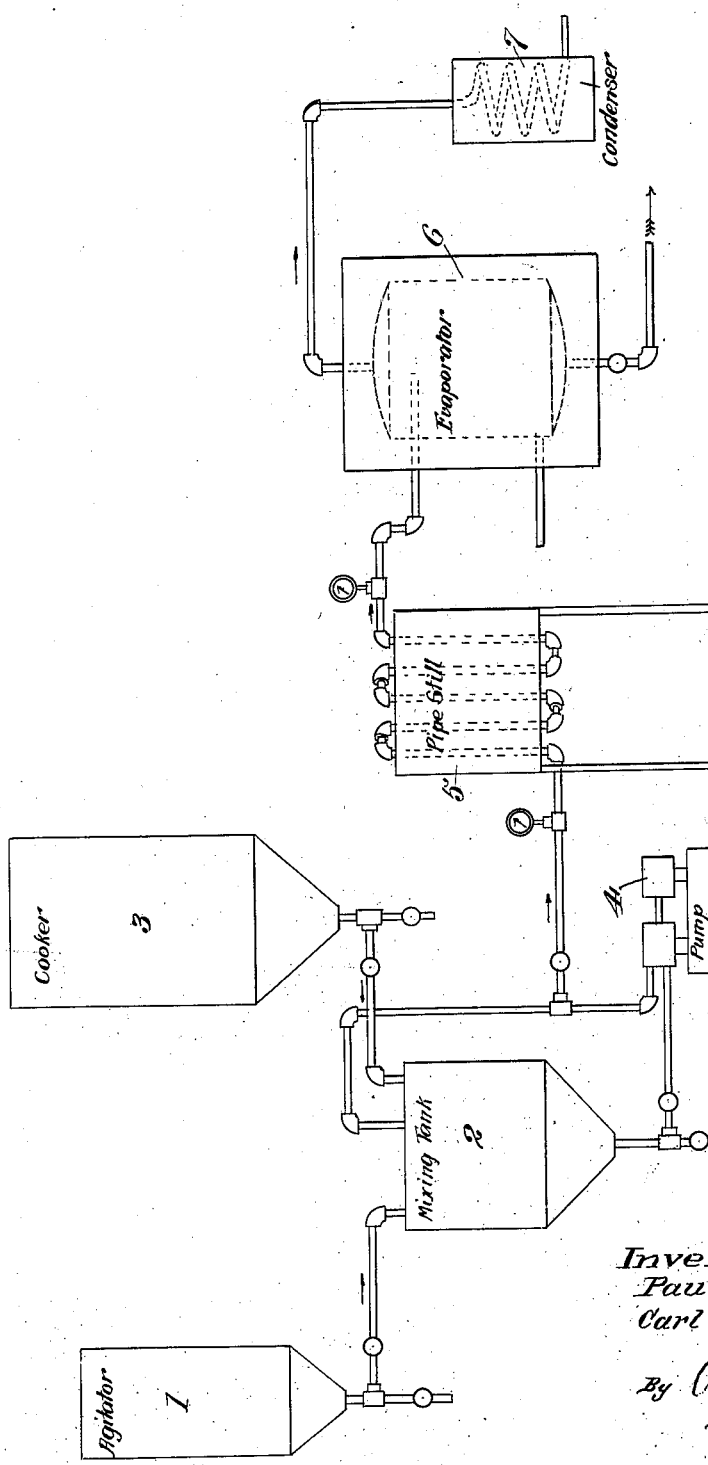

1,562,001

UNITED STATES PATENT OFFICE.

PAUL W. PRUTZMAN AND CARL J. von BIBRA, OF LOS ANGELES, CALIFORNIA, ASSIGNORS TO GENERAL PETROLEUM CORPORATION, OF LOS ANGELES, CALIFORNIA, A CORPORATION OF CALIFORNIA.

METHOD OF TREATING OIL.

Application filed September 2, 1922. Serial No. 586,042.

*To all whom it may concern:*

Be it known that PAUL W. PRUTZMAN and CARL J. VON BIBRA, citizens of the United States, residing at Los Angeles, in the county of Los Angeles and State of California, have invented certain new and useful Improvements in Methods of Treating Oils, of which the following is a specification.

The hereinafter described invention relates to the art of treating oils generally for the decolorization and removal of impurities therefrom, and while the invention is adapted for the treatment of all types of oils the same is more particularly adapted for use in connection with petroleum lubricating oils and the objects of the invention are to simplify and expedite the decolorization and purification of the oils and for the production of a material from minerals of the montmorillonite type adapted for the purposes desired.

Heretofore it has been customary in the treatment of oils with mineral adsorbent solids for the decolorization and purification thereof, to subject the mineral to reaction with acid while in a plastic condition, washing the resultant mixture substantially free from the acid and reaction products, draining or filtering the washed mineral to free the same from its water soluble constituents, drying the mass at an elevated temperature and reducing the dried mass to a powder. When this dried powder is applied to an oil to be decolorized at a temperature in excess of 250° F., oxygen is liberated and coacts with the oil to such an extent as to produce a darker color in the oil than would have been obtained if oxygen had not been so liberated. At temperatures lower than about 250° F. the air which is caused to be occluded in the pores of the mineral by drying and grinding in contact with the air is, in large part, retained in the pores of such mineral when same is brought into contact with oil at such temperatures, but at any temperature materially higher than 250° F. the occluded air is displaced by the oil and liberated in the form of microscopic bubbles having a very large contact surface and a correspondingly great effectiveness as an oxidizing agent.

In the carrying out of our invention for the production of a decolorizing and purifying material, the washed mineral earth is not freed from water by draining or filtration but by evaporation in contact with the oil to be treated, and while maintained out of contact with the atmosphere, and the material is employed and utilized for intermixture with the oil to be treated in the form of a mud or plastic mass.

It has been found from practical operation that a decided loss in effectiveness is suffered by exposing or permitting the exposure of the decolorzing and purifying material to air upon the removal of the wash water therefrom, which loss in effectiveness in all probability is occasioned by or due to the adsorption of gases and impurities from the air, and the loss in effectiveness continues until approximately an equilibrium is reached and such equilibrium in many cases is about one-half of the original effectiveness of the material. Obviously, it is extremely advantageous to preserve or maintain available the full original effectiveness of the material, and if such can be maintained and preserved a smaller quantity of the decolorizing and purifying material may be utilized in the treatment of oils than heretofore required for such purposes, to such an extent materially reducing or minimizing the expense of treatment, while at the same time the work of treatment is expedited and labor incident thereto reduced to a minimum. Under our invention, these savings are made or rendered possible by allowing the oil which is to be decolorized and purified to be brought into intimate contact with the solid particles of the mud or plastic mass of the mineral earth as the water contained therein is evaporated from around them and from the interior of the pores with which each particle which is so to speak, honeycombed, and in this manner permitting the full effect of the material to be expended on the oil while all other substances are excluded.

The removal of the water from the plastic mass or mud is cheaper and a much simpler process when brought about by the quick evaporation in the presence of the oil to be treated, than when effected by draining or filtration, followed by relatively slow drying in contact with the air or other gases.

Again, as the oil to be treated or under treatment is necessarily brought into intimate contact with the mud or plastic material, there is no object in providing a dry oil and inasmuch as the material when acting upon the majority of oils has the power of removing acids therefrom, there is no necessity for the use of an alkali for the purpose of neutralizing the acid treatment or rather the acid treated oils and such step in the method of treating the oils is eliminated. In the treatment of the oils the method may be said to reside in the following steps:—Agitation of the oils with sulphuric acid, removing the finely divided acid sludge and most of the free acids, intermixing with the oil a decolorizing or purifying agent or medium formed from mineral earth rendered plastic or placed in muddy condition by the addition of water thereto and when needed preferably treating with acid as for example sulphuric acid, which mudded mass after the water treatment is permitted to settle for several hours and all clear water is decanted off and the mud, containing approximately 85% of water is run into a mixing tank together with the wet oil. The two substances are then thoroughly intermixed and conveyed to a heater where the temperature is raised for the evaporation of its water contents, and the water, together with any light distillates, allowed to distil off.

We have found that where the mineral earth decolorizing and purifying medium is utilized in a plastic or mudded form and intermixed with the oil without exposure to the atmosphere, the oil is brought into more intimate contact with the surface area of the material than where the earth such as fuller's earth adsorbent clays or minerals of the montmorillonite type is previously treated, dried and reduced to a powdered form in the presence of, or while exposed to the atmosphere with the result that a quicker and more effective reaction takes place and better color to the oil is produced and less of the earth required for treatment than is necessary under the present methods of decolorizing and purifying of the oils.

Any suitable form of apparatus may be employed for the carrying out of the above described method invention, a simple, practical form of apparatus for such purpose being illustrated diagrammatically in the accompanying sheet of drawing and wherein the numeral 1 is employed to designate a suitable agitator connected with a mixing tank 2, which receives the oil from the agitator and with which connects a cooker 3 within which the mineral earth is introduced and placed in plastic or mudded form. From the mixing tank the oil under treatment having intermixed therewith the plastic or mudded mineral material is delivered by a pump 4 into a pipe still 5 and is discharged therefrom into an evaporation 6, from which the vapors are conveyed to a condenser 7. Where this form of an apparatus is employed for treatment, wet oil still partly acid is run from the agitator 1 into the mixing tank 2, the untreated material of the montmorillonite type preferably is placed in the cooker 3 and in said cooker is rendered plastic by the addition of water and is treated with acid. After being permitted to settle for a predetermined period of time, the excess water is decanted off and the mud or plastic mass is then run into the mixing tank while excluded from contact with the air and the two mixtures are thoroughly intermixed within the said tank and then discharged into the still 5 through the action of the pump 4 and from the still discharged into the evaporator where the pressure is released and the water, together with light distillates is distilled off and conveyed to the condenser 7. If so desired, flue gases from the still 5 may be permitted to pass around the evaporator 6 to maintain a temperature in the latter sufficiently high to insure evaporation of all water.

By the use of the expression "without exposure to the atmosphere" as herein employed, we do not wish to be understood as meaning that the mudded or plastic material to be delivered for intermixing with the oil to be treated, shall be housed or protected against exposure to the atmosphere, inasmuch as the water of the mass serves to protect the mudded mineral material against contact with the outside atmosphere. The said term as we make use thereof in the present case simply means that the decolorizing mudded material shall not be brought nor permitted to come to a condition of dryness prior to being delivered for intermixture with the oil to be treated, but shall be maintained in its mudded form until the oil with which it is intermixed is raised in temperature to such a point as will cause the evaporation of the water contents of the mudded mass.

By the placing of the mineral material in the mudded or plastic form, it is obvious that as the same is intermixed with the oil during treatment for decolorization the oil is brought into contact with what may be termed a film of a decolorizing agent, whereby all available properties of the material are utilized for decolorizing and purifying purposes.

It is not our intent to restrict or limit the invention to the use of any particular type of mineral earth in connection with the treatment of the oils, but on the contrary we wish to be understood as claiming broadly any other mineral earths capable of employment as a decolorizing and purifying medium when utilized for incorporating or intermingling with the oil in a plastic or mudded condition and while protected or maintained from exposure to the atmosphere, the water of the material being evaporated therefrom under the heat temperatures employed in the treatment of the oils.

Having thus described our invention what we claim as new and desire to protect by Letters Patent of the United States, is:—

The method of decolorizing oil which consists in preparing a mass of pulverulent solid decolorizing material in the form of an aqueous mud, whereby air is excluded from the pores of the decolorant, mixing such mud with the oil to be decolorized and heating the mixture until the water is driven out of the aqueous mud, whereby the solid decolorizing material is brought into intimate contact with the oil, and finally separating the spent solid decolorant from the decolorized oil.

In testimony whereof we have signed our names to this specification.

PAUL W. PRUTZMAN.
CARL J. von BIBRA.